(12) United States Patent
Duprey et al.

(10) Patent No.: US 7,165,155 B1
(45) Date of Patent: Jan. 16, 2007

(54) SYSTEM AND METHOD FOR TRACKING CHANGES ASSOCIATED WITH INCREMENTAL COPYING

(75) Inventors: Dennis Duprey, Raleigh, NC (US); Walter A. O'Brien, III, Westborough, MA (US); Paul T. McGrath, Raleigh, NC (US); David Haase, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 255 days.

(21) Appl. No.: 10/652,967

(22) Filed: Aug. 29, 2003

(51) Int. Cl.
*G06F 12/00* (2006.01)

(52) U.S. Cl. ...................................... 711/162

(58) Field of Classification Search ............. None
See application file for complete search history.

(56) References Cited

U.S. PATENT DOCUMENTS

2003/0101321 A1* 5/2003 Ohran .................... 711/162
2005/0027956 A1* 2/2005 Tormasov et al. ......... 711/162

* cited by examiner

*Primary Examiner*—Mano Padmanabhan
*Assistant Examiner*—Duc T Doan
(74) *Attorney, Agent, or Firm*—K. Gupta

(57) ABSTRACT

This invention is a system and method for assisting the performance of incremental copying of data in a data storage environment and includes a tracking mechanism. In one embodiment, the tracking mechanism is implemented in such a way that it is able to track changes while allowing access to production data by carrying out unique methodology. In other embodiments, implementations include a system, a computer program product, or an apparatus, wherein each embodiment is configured for carrying out the steps involved in the methodology.

10 Claims, 10 Drawing Sheets

SYSTEM AND METHOD FOR TRACKING CHANGES ASSOCIATED WITH INCREMENTAL COPYING

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage management, and more particularly to copying or replication of data in a data storage environment.

RELATED APPLICATION

This Application is related to U.S. patent application Ser. No. 10/652,371 filed on even date with the present U.S. Patent Application and entitled "System and Method for Tracking Changes Associated with Incremental Copying."

BACKGROUND

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure data is not lost due to problems with the computer systems, such as for example, loss of electrical power. However, there are costs associated with backing up or otherwise copying or replicating data. Such costs include the data being unavailable to an application that may require access to it. For example, in a normal business operation, not as a production environment, data may be needed for an update or in relation to a transaction on a close to full-time (i.e. 24 hours a day, 7 days a week) basis. On the other hand an attempt to keep production data available may involve significant overhead to keep track of what has changed with data made available between the time that data is begun to be copied and/or replicated and that process ends. Typically changes are tracked and the copied data is synchronized to compensate for any changes that may have taken place due to transactions or other updates. Some systems only copy, replicate, or back up data that has changed since the last such operation and this is known as incremental copying, replicating, or backup. Again computer processing overhead is needed to keep up with changes and make comparisons for such incremental operations. It would be advantageous and an advancement in the computer arts if such incremental copying, replication, or backup could be performed while also reducing it's impact on computer processing overhead to track such changes.

SUMMARY OF THE INVENTION

To overcome the problems of the prior art mentioned above and to provide advantages also described above, this invention is a system and method for tracking changes associated with an incremental copy of data.

In one embodiment, the tracking mechanism is implemented in such a way that it is able to track changes while allowing access to production data by carrying out unique methodology. In other embodiments, implementations include a system, a computer program product, or an apparatus, wherein each embodiment is configured for carrying out the steps involved in the methodology.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
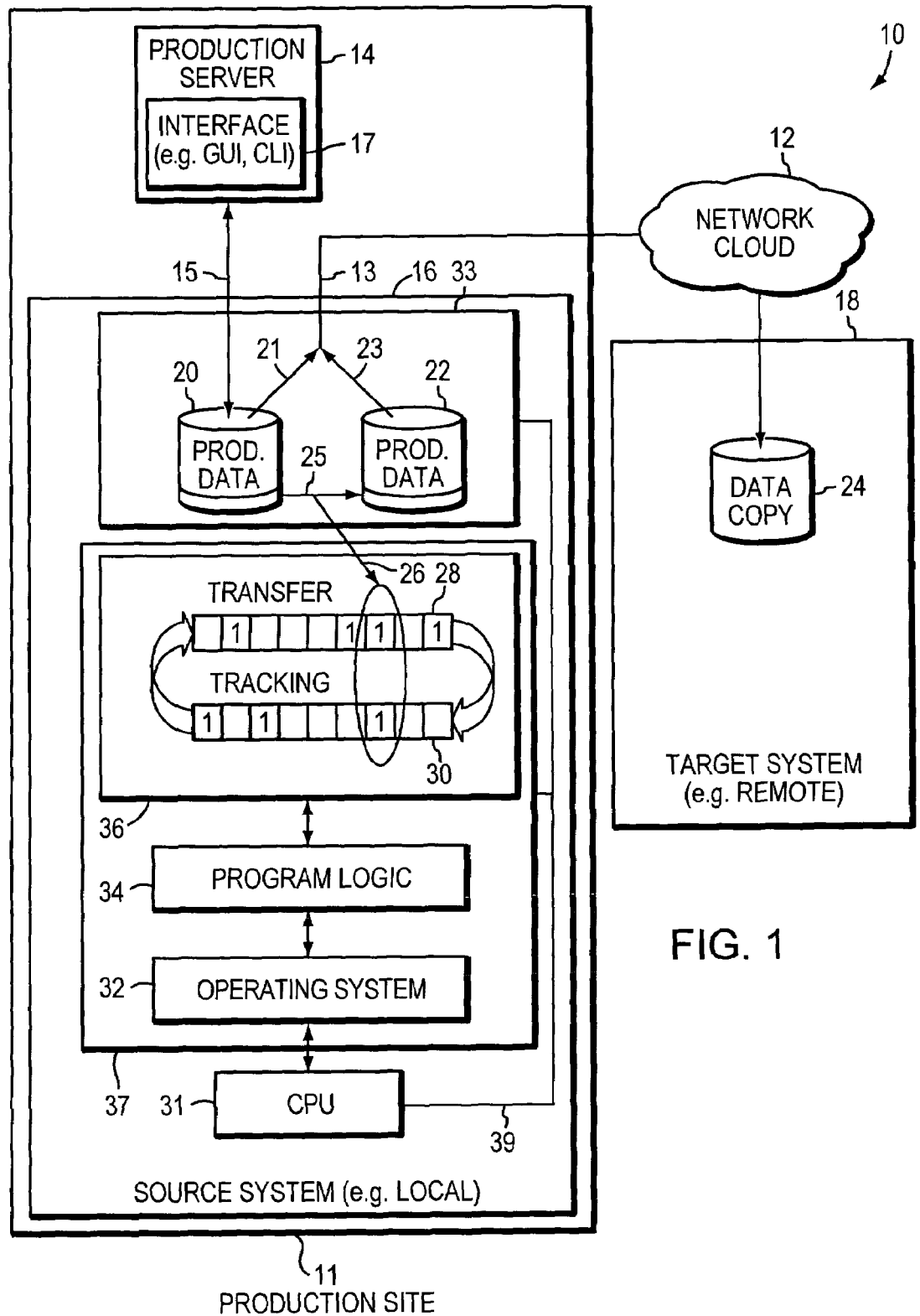
FIG. 1 shows a block diagram schematic of an embodiment of a data storage environment including one or more data storage systems and including a Production Site and further including program logic for carrying out the method embodiments of the present invention.

In the preferred embodiment, the preferred invention operates in cooperation and may be a part of computer software, such EMC Corporation's SAN Copy software. SAN Copy is configured for allowing central manage movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, SAN Copy is a storage-based implementation to remove impact from a server which may be hosting application software in a production environment.

Typically, SAN Copy operates in cooperation, with EMC's TimeFinder and SnapView local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

SAN Copy is an embodiment of an array to array copy technology. Data is transferred from a source array to a remote destination array with no attached server involvement pertaining to the data movement (strictly storage array to array data communication). Incremental SAN Copy is an enhancement to the SAN Copy product that is planned to be offered by EMC Corporation which allows customers to update data on remote arrays by sending only the modified data since the last time an incremental update had occurred.

Snapview is other software available from EMC Corporation and which embodies important features of the present invention. SnapView embodies the invention which supports an incremental copy feature, by employing a session as a tracking mechanism to track the changes for an Incremental Copy Session and to maintain the consistency of a changing data image during the life of the data copy. The inventors have critically recognized that such a mechanism may be employed to advantageously minimize the performance impact of accessing production data for copying or replication.

With regard to some terminology in this application, it will be helpful to discuss some terms, shown in Table 1.

TABLE 1

Terminology

COFW—copy on first write. Mechanism for maintaining a pointer based point in time copy of data. The COFW policy insures the original version of data is saved before allowing the data to be modified.

Incremental SAN Copy (ISC)—a feature that provides users with the ability to perform incremental updates to copies of their production data. These copies can reside on the same array as the production data, or on remote arrays. The data transfer is array-to-array without server involvement. ISC is an extension to the SAN Copy product.

Incremental SnapView Session—a special SnapView Session that is created specifically for an ISC Session. These sessions are used to track which data areas of the source data are modified as well as protect the user selected point-in-time copy of the data while an incremental copy is in progress.

Delta Bitmap—data structure in SnapView that is used to track changes in granularities between 2 KB and 64 KB for an incremental SnapView session. The delta bitmap consists of two parts.

Tracking Bitmap—part of the delta bitmap that is currently tracking changes. The changes that are tracked do not result in a COFW.

Transfer Bitmap—The part of the delta bitmap that is used by the Incremental SnapView Session to provide SAN Copy with the data to be copied. It represents the changes from the last copy operation to the most recent "mark" operation.

Marked—A state entered into by the receipt of a mark command that causes the tracking bitmap to become a transfer bitmap and causes the former transfer bitmap to become the tracking bitmap. COFW operations are performed in this state to protect the point-in-time copy of the data.

Unmarked—A state entered into by the receipt of a unmark command or by detection of an internal error, that results in the discarding of COFW chunks that occurred while marked, and results in the merging of the bits in the transfer bitmap into the tracking bitmap. The state will automatically transition from marked to unmarked after an ISC data transfer has completed successfully.

Overview of a Preferred Embodiment

In a preferred embodiment, Program Logic cooperates with and may include EMC Incremental SAN Copy features that use the EMC SAN Copy and EMC SnapView program code to perform incremental copy operations to specified Production Data. One skilled in the art will recognize that the invention is not limited to such preferred embodiments; however, they are described herein as an example of implementing the invention. Returning to an exemplary embodiment overview, the user can specify the point-in-time copy of the data to be transferred to the remote arrays by "marking" the data via an administrative command. Any time after the data has been "marked"; the user can initiate the SAN Copy transfer of the data to one or more remote arrays. After an initial full copy, subsequent copies will only copy portions of the production data that changed since the previous copy.

Preferred Embodiment Description

Referring to FIG. 1, Data Storage Environment 10 includes a Production Server 14 with an Interface 17 (e.g. a graphical user interface a.k.a. GUI or command line interface a.k.a. CLI) for communicating with Local Data Storage System 16 across path 15, and in particular for accessing Production Data 20, wherein Production Data Copy 22 is typically COFW data made for consistency and indicated along copy path 25, and wherein tracking actions along path 26 will be discussed below. The Production Data 20 is updated by write requests along path 15 in Server I/O, which results in regions of modified storage tracked by a tracking session 36. An incremental tracking session 36 on the Data Storage System 16 supports an incremental copy feature, such as the preferred Incremental SAN Copy feature available from EMC Corporation. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can by physical volumes, although logical volumes are preferred. Devices and volumes in a logical sense are also used interchangeably throughout. Note also that throughout this document, like symbols and identical numbers represent like and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume.

In a preferred embodiment the tracking session 36 is part of EMC's Snapview product, and preferably includes: (1) maintenance of two data structures, which for purposes of simple explanation are shown as bitmaps (but one skilled in the art will recognize that the invention is not limited to a specific data structure such as bitmaps), transfer bitmap 28 and tracking bitmap 30 for tracking incremental changes to the production data (the roles of the transfer and tracking bitmaps switch whenever a session is marked); (2) the ability to mark and unmark a point in time associated with a session; (3) reduced COFW overhead on access to Production Data 20 and 22, preferably in non-volatile memory 33, such as a computer hard drive, including: (a) No COFWs unless the session is marked; (b) COFWs only occur if the data had been marked to be copied in the transfer bitmap; and (c) the probability of having to perform a COFW diminishes while an ISC is in progress.

Generally, in a preferred embodiment the two bitmaps are used by the Program Logic 34 in cooperation with the operating system 32, and the CPU 31 on the source data storage system 16. The bitmaps and Program logic operate in electronic memory 37 and when executed by CPU 31 over communication path 39 carry out method steps embodying the invention. It is preferred that the Program Logic be computer software although it is possible for it to be embodied in whole or part in hardware or firmware.

Figure 10:
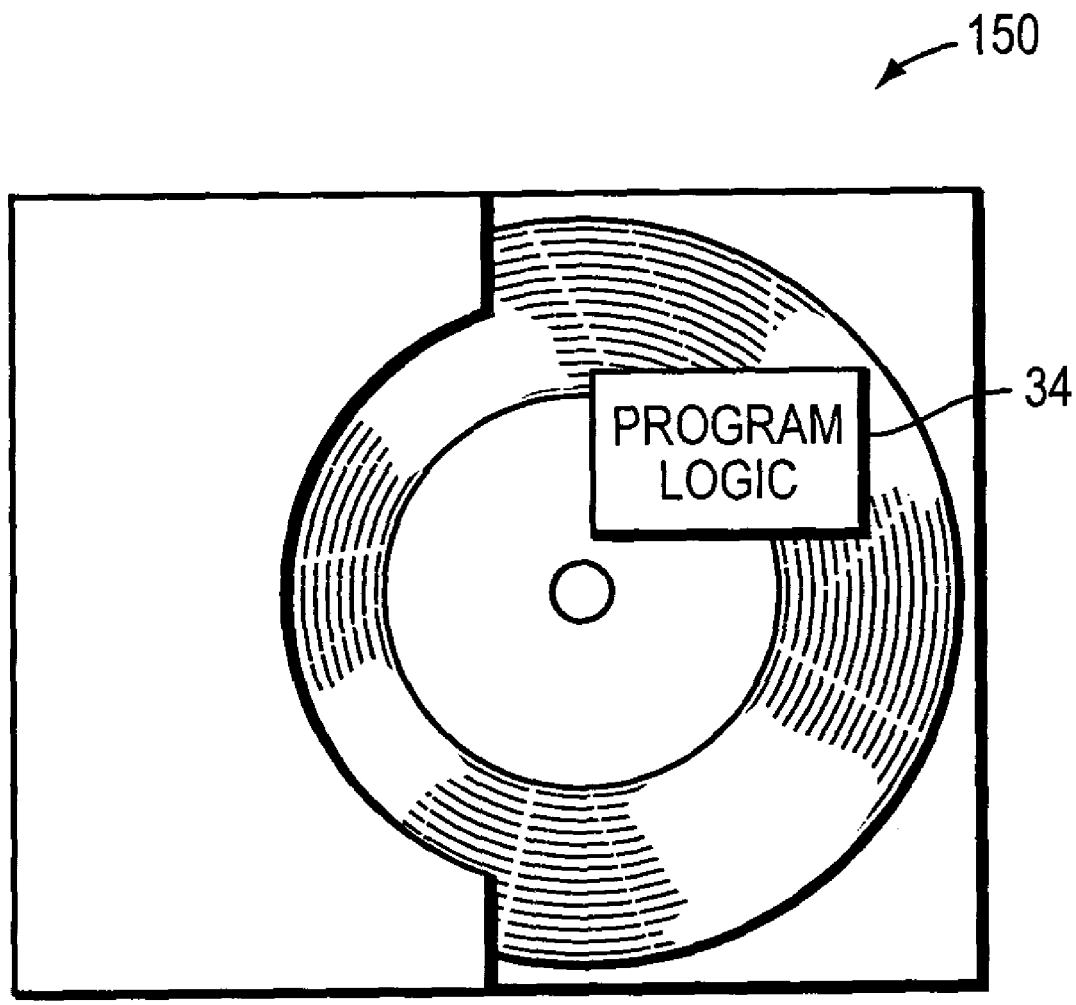
FIG. 10 shows a computer-readable medium including computer-executable code including program logic for carrying out method steps of the method embodiments of the present invention.

Program Logic 34 may also be embodied on a computer-readable medium 150 as shown in FIG. 10, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Tracking changes to the production data and for maintaining what is to be copied via ISC is a useful part of the embodiment of this invention. Preferably, during the life of an Incremental Session, these two bitmaps swap their roles after a mark operation. After a session is marked, a COFW will be performed only if the transfer bitmap (which was the tracking bitmap before the mark) indicates that the specific region of the data is yet to be copied via ISC. Further, as the data is copied, the regions corresponding to the data transferred in the transfer bitmap are cleared which further reduces the amount of COFW activity needed. As the transfer proceeds, the probability of having to perform a COFW diminishes. These optimizations may significantly reduce the number of COFWs necessary to maintain a consistent copy of the production data and are an improvement of prior art systems that may include known pointer-based snapshot technologies.

Referring again to FIG. 1, Production Data 20, as it pertains to this invention, exists in two states: marked and unmarked. All write requests to Production Data, that has an incremental session associated with it, are tracked (i.e., records of regions on the storage where the change occurred is maintained in the tracking bitmap). Prior to making an incremental copy to Data Copy 24 on a Target or Remote Data Storage System or Storage Array 18, over a network cloud 12, which may be for example a wide area network, the state of the data is transitioned to indicate marked. Then in a preferred embodiment, the tracking bitmap becomes the transfer bitmap and a cleared transfer bitmap is used as the tracking bitmap. Thus, the role of the tracking and transfer bitmaps will switch each time data is marked. This switching of roles should be atomic in nature with respect to Production Server 14 writes to the Production Data 20. Changes to the Production Data since the last incremental copy are copied to one or more remote arrays only when the data is in the marked state. As soon as an incremental copy is completed the state of the production data is reverted to unmarked by the Program Logic 34.

The ISC process will transfer the regions indicated in the transfer bitmap. While the production data is being transferred, new server write requests are tracked for the next transfer. If a server write request is destined to modify a region that is going to be transferred (the transfer bitmap indicates that region is to be transferred), the data at the time of the mark needs to be preserved. The preferred incremental SnapView will perform a COFW of the region before the server write request is allowed to proceed. The ISC transfer, when it gets to the region that had a COFW performed upon it, will transfer the data that has been saved via the COFW. After a region has been transferred via ISC, the region in the transfer bitmap is cleared. This will reduce the probability of having to perform a COFW as the ISC proceeds. A COFW should be performed if the region indicated in the transfer bitmap is being overwritten before the regions have been transferred to the remote array or the resultant data copy will be inconsistent. This is represented by copy path 25 indicating a COFW from Production Data 20 to Production Data Copy 22. Along Path 26, changes to the transfer and tracking bit maps indicate the state of data that may be later transferred to Data Copy 24. Along path 21 and 23, data regions marked by the transfer bit map from either the Production Data or COFW Production Data Copy are sent over path 12 through Network Cloud 12 to Data Copy 24 on the Target 18. One skilled in the art will recognize that the Data Copy 24 could also reside on the same array or data storage system as the Production Data, but there are advantages related to availability of data in sending it to another system.

Figure 2:
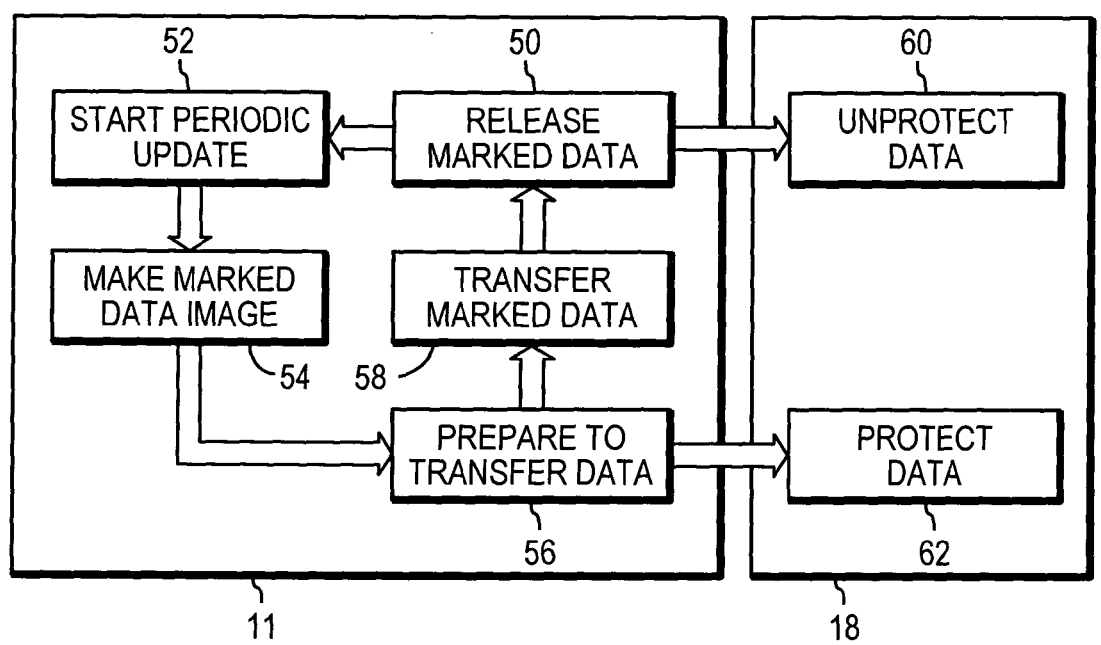
FIG. 2 shows another schematic block diagram including a depiction of functions carried out by the systems and program logic of FIG. 1 and acting on data of the one or more data storage systems of FIG. 1.

Referring to FIG. 2, the preferred usage of the tracking methods of the preferred embodiment are now described, and each step will be further described in FIGS. 3–9. Although steps are portrayed in FIG. 2, to correlate to the respective Data Storage System on which the primary effect is experienced, one skilled in the art will recognize that variability, including interchangeability is possible without deviating from the spirit of the invention. On the Local System 16 (FIG. 1) within the Production Site 11, a periodic update is started in functional block 52, and a marked data image is made in functional block 54. Marked Data is transferred in step in functional block 58. A preparation to transfer data is shown functional block 56. On the Remote System 18, an unprotect of the data is performed in functional block 60, and a corresponding protect of the data is performed in functional block 62. Each of these Functional Blocks and the steps involved with carrying out the functions described in the Functional Blocks is discussed below with reference to FIGS. 3–9.

Figure 3:
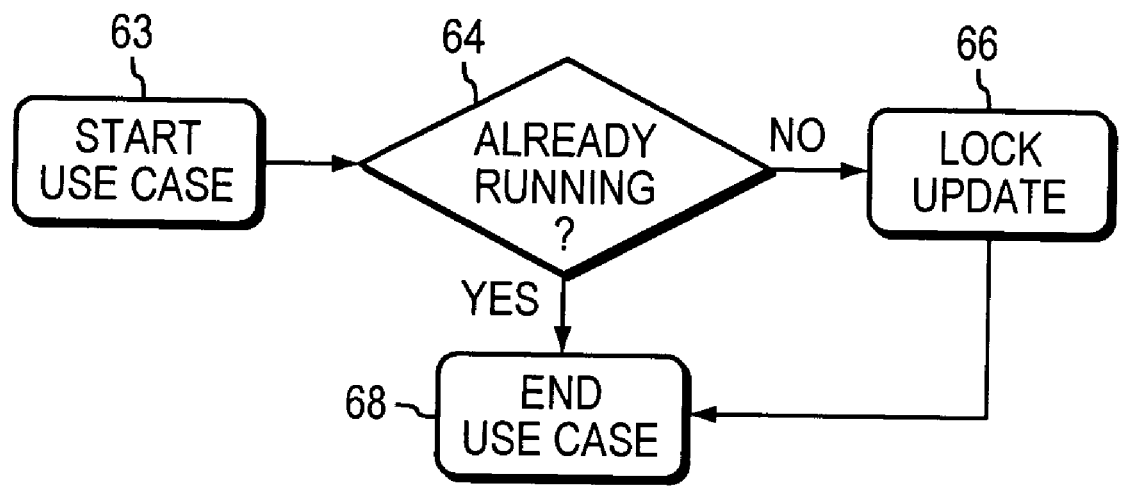
FIG. 3 shows a flow logic diagram of steps for carrying out the method embodiments of the present invention.

Referring to FIG. 3, steps involved within Functional Block 52 of FIG. 2 are described now. Preferably, the period between updates is scripted, by using some type of Administration program, e.g. EMC's Navisphere CLI product. This assumes the data has been previously fully copied (the SAN Copy software will automatically perform a full copy the first time it is used). In step 63, the use case begins when a periodic update needs to occur. In step 64, a query is posed to determine if a previous update is still active, and if so, in step 68, this update is aborted and an appropriate log message is generated. If the answer to the query is no, in step 66, a lock is obtained to prevent concurrent periodic updates on the same set of data. The consistency of the data and the performance impact is predicated on a single invocation periodic update mechanism for a given set of data. The lock will be released at the end of update period and in all cases where the update terminates prematurely. For the simplicity, it is assumed that the error cases are handled correctly and the lock is released accordingly, although one skilled in the art will recognize that might not be the case. Flow is returned to step 68, in which the use case ends.

Figure 4:
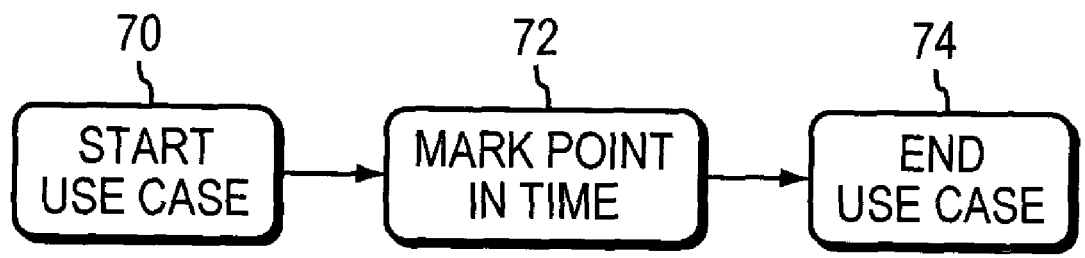
FIG. 4 shows another flow logic diagram of steps for carrying out the method embodiments of the present invention.

Referring to FIG. 4, steps involved within Functional Block 54 of FIG. 2 are now described. In step 70, the use case begins after the period update mechanism has been started. In step 72, and preferably via an administrative call, the Program Logic marks a consistent point in time for use by the incremental copy feature. This is explained in greater detail in the transfer marked data section. Following the mark in time, the use case ends in step 74.

Preferably, the marked image will be the source of the update mechanism via the preferred incremental copy feature to provide an method of marking and keeping track of the incremental data changes to be transferred. The Program Logic 34 (FIGS. 1 and 10) in a preferred embodiment encompasses at least in part the integration of EMC's Snapview with Incremental Copy SAN Copy. Data protected by this mechanism may span storage processors in the storage array. Because there is no application or host integration to make the data quiescent, a consistency mechanism, with respect to any new updates to the data, should be used to guarantee a consistent data image is created. The consistency mechanism marks the data at a consistent point in time before allowing any updates to the data to complete. The mark mechanism is described in more detail with reference to FIG. 7 below. The resultant data image must represent the data at some point in time and must be recoverable (as if the server had crashed at the instant in time the image was made).

Figure 5:
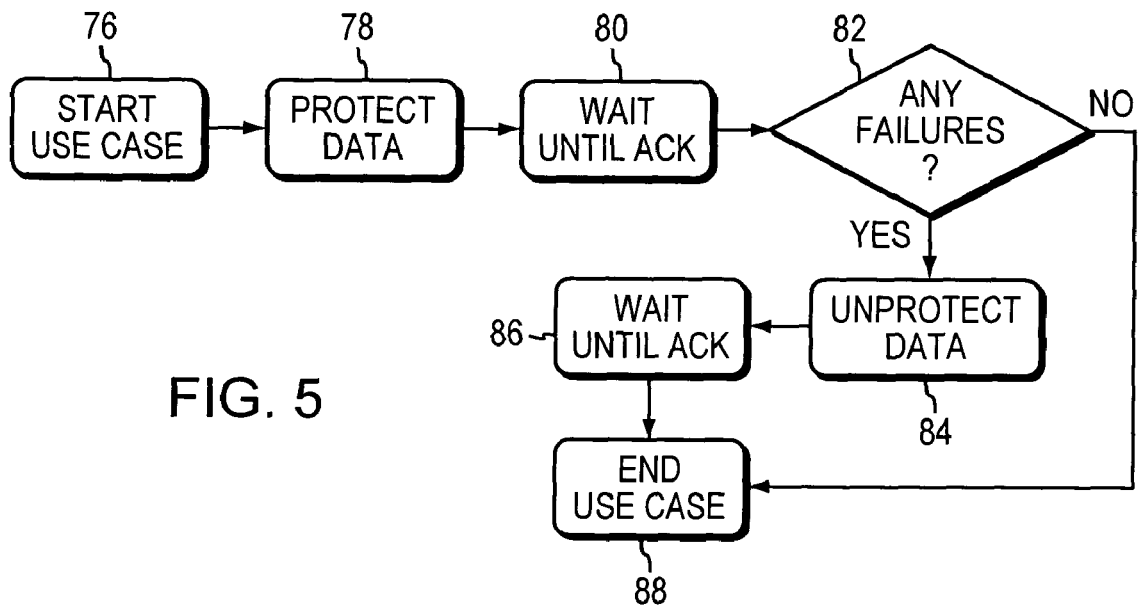
FIG. 5 shows another flow logic diagram of steps for carrying out the method embodiments of the present invention.

Referring to FIG. 5, the Prepare to Transfer Data Functional Block 56 of FIG. 2 is now described. This overall function is used to trigger an event at the Remote System. Before the data is transferred to the remote site, the consistent replicated data at the remote site should be protected because the data transfer will send over incremental updates out of order. This guarantees that the data at the remote site is always maintained consistently. In step 76, the use case begins after the consistent image has been made. In step 78, an administrative request is sent to the Remote location to protect the data. In step 80, this event is suspended until an acknowledgement is received from the remote site or until a time out has expired. The acknowledgement could indicate that the operation at the remote site failed. In step 82, a query is posed, wherein if any attempt failed to protect the data, an administrative request is sent to unprotect the data (removes partial protection) in step 84. In step 86, this event is suspended until an acknowledgement is received from the remote site or until a time out has expired. The acknowledgement could indicate that the operation at the remote site failed. In the event of a failure, the failures are logged and the periodic update is aborted and the use case ends in step 88. Likewise, wherein there are no failures, the use case also ends in step 88.

Figure 6:
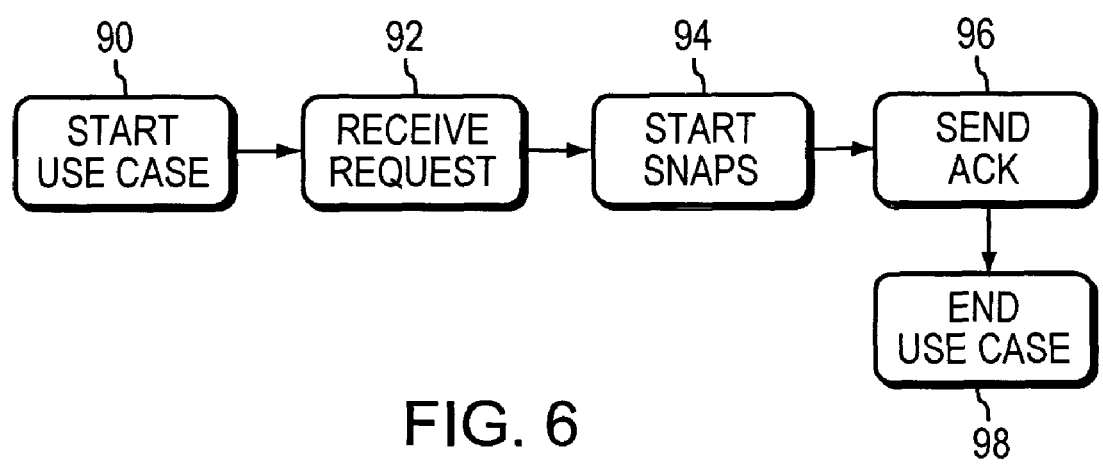
FIG. 6 shows another flow logic diagram of steps for carrying out the method embodiments of the present invention.

Referring to FIG. 6, the Protect Data Functional Block 62 of FIG. 2 is now described. Preferably, this event occurs at the remote site. A purpose of this step is to preserve the consistent data image that was last transferred in the previous period before transferring out of order data to the remote site. In steps 90 and 92, the use case begins at the remote site when an administrative request is received from the Production Site. In step 94, the request contains enough information to start the sessions (preferably EMC Snapview's Snaps sessions) in order to protect the consistent data image at the Remote location. If the snap sessions are already protecting the data, then this is a condition left over from a failed update attempt, and this function should behave as if the sessions were started successfully. In step 96, an acknowledgement message is sent back to the Production Site. The acknowledgement indicates the result of the snaps and in step 98 the use case ends.

Figure 7:
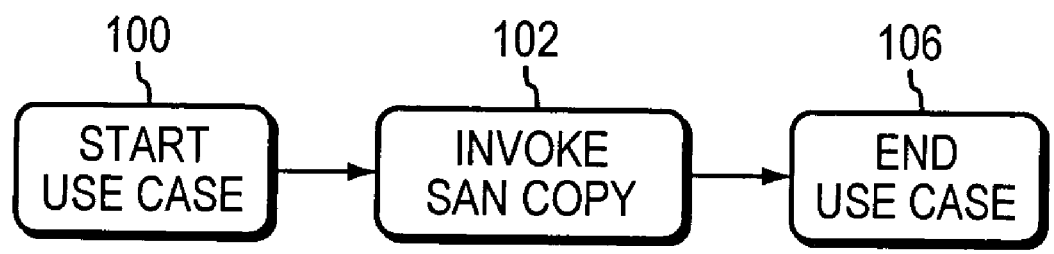
FIG. 7 shows another flow logic diagram of steps for carrying out the method embodiments of the present invention.

Referring to FIG. 7, the Transfer Marked Data Functional Block 58 of FIG. 2 is now described. Preferably, data is transferred, using SAN Copy, from the Local System 16 (FIG. 1) in the Production Site 11 to the Remote System 18. In step 100, the use case begins after the data image has been protected at the Remote location. This minimizes the disruption to the production environment because the data transfer to the Remote location is done asynchronously to the production application access and the amount of COFW activity is minimized due to the invention disclosed herein. In step 102, in a preferred embodiment, an administrative request is used to kick off incremental SAN Copy using the predefined SAN Copy descriptor(s) to transfer the marked data to the Remote location. In step 106, the use case ends.

Preferably, Program Logic 34 includes the preferred EMC SAN Copy integrated or at least in communication with the preferred EMC's SnapView; however, the functionality of the embodiments of this invention may of course be accomplished with other software than the preferred software (or even in hardware or firmware). An incremental SnapView session is preferably started when incremental SAN Copy descriptors are created. This incremental session is used to track changes and maintain the data consistency while a SAN Copy transfer is in progress. Unlike prior art sessions, this incremental session does not perform Copy-On-First-Write (COFW) like a standard snap session. Instead, the preferred SnapView maintains two sets of map entries. One set of maps is used to track the data areas that have been changed due to write activity to the source of the snap. The second set of maps is used to indicate to the preferred SAN Copy what data is to be transferred. The role of the maps will flip or alternate each time the periodic update is started. Flipping the role of the bit maps is freezing a consistent data point in time for the SAN Copy.

During the process of a SAN Copy transfer, the second set of map entries is emptied. At the end of a completed successful transfer, there are no map entries in the second set (as the data is transferred, the map entry is cleared). In addition to indicating to SAN Copy what needs to be transferred, the second map is used to maintain the data consistency of the SAN Copy transfer. If an entry in the second map exists for an area of the source of the snap that is in the process of being written, SnapView will perform a COFW to provide a consistent view of the data to SAN Copy. The reason the map entries are removed after each area of the data transfer is complete is to minimize the COFW activity. If an area has been transferred, no COFW needs to be performed on that area of the source as the consistent data has already been transferred to the Remote location. As the SAN Copy progresses, the odds of having to perform a COFW drop. This probably reduces the performance impact on the production environment.

In addition, SnapView can be tuned to track the data areas that have changed down to a 2 KB level from the default of 64 KB. This capability greatly reduces the amount of data that SAN Copy needs to transfer to the remote site. However, the finer grained the tracking, the more potential performance impact to the production environment at the Production Site. Network bandwidth, data currency requirements, and production overhead will dictate the level of granularity desired.

Figure 8:
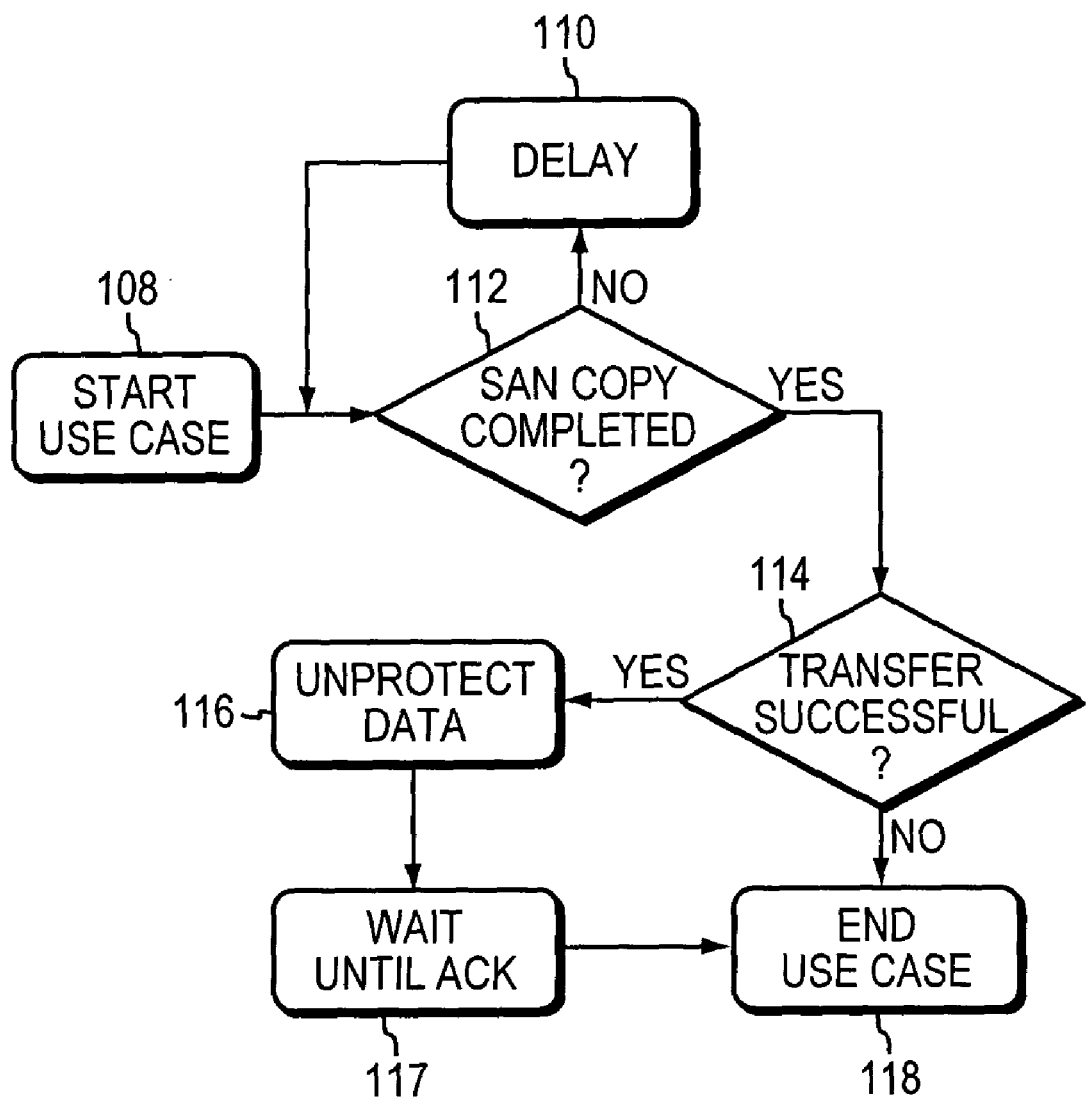
FIG. 8 shows another flow logic diagram of steps for carrying out the method embodiments of the present invention.

Referring to FIG. 8, the Release Marked Data Image Functional Block 50 of FIG. 2 is now described. In step, 108 the use case begins after transfer of the data have been started. This step loops with an appropriate delay of step 110 between each iteration until the periodic update is completed. Completed, in this context, could be a successful transfer or a failed transfer, according to the query of step 112. In step 114, which occurs if the data transfer is successful, an administrative request is sent to the Remote location to unprotect the data in step 116. In step 117, this event is suspended until an acknowledgement is received from the Remote location or until a time out has expired. The acknowledgement could indicate that the operation at the Remote location failed. If the transfer failed, then the protected images at the Remote location should be maintained until a successful transfer occurs, and eventually in step 118 the use case ends.

Figure 9:
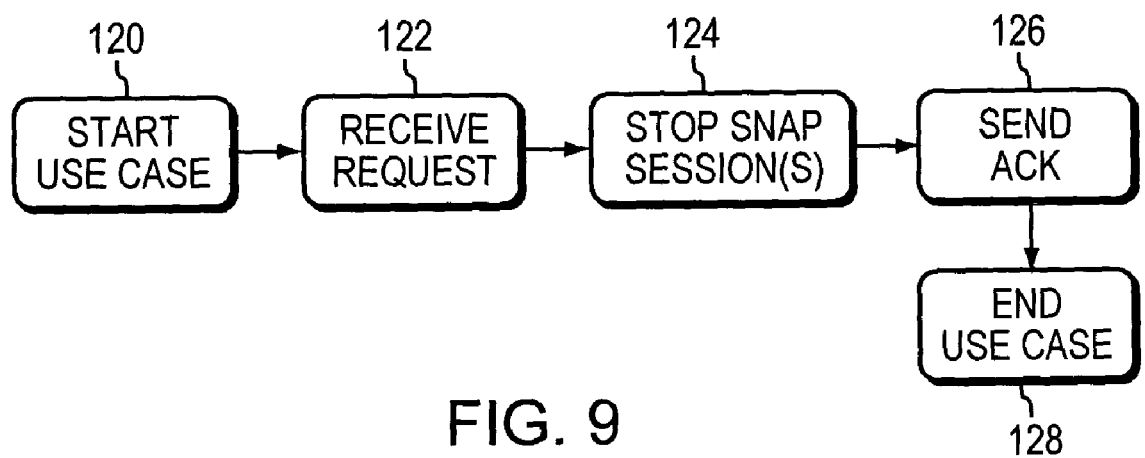
FIG. 9 shows another flow logic diagram of steps for carrying out the method embodiments of the present invention.

Referring to FIG. 9, Unprotect data Functional Block 50 of FIG. 2 is now described. Preferably, this event occurs at the Remote System 18. A purpose of this step is to stop the preferred EMC Snapview Snap sessions that were used to hold the consistent data. This can be used for cleanup or during the normal processing of an update. In steps 120 and 122, the use case begins at the Remote location when an administrative request is received from the Production Site 11. In step 124, the administrative request contains enough information to stop the preferred Snap session(s) to unprotect the consistent data image at the remote site. In step 126, an acknowledgement is sent back to the Production Site 11. The acknowledgement indicates the result of the stop of the snap session(s) in step 128 and the use case ends.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a server, a first and second data storage system, and production data being stored on the first data storage system, and a copy of the data nominated as the data copy being stored on the second data storage system, a method of handling updates to the data copy, the method comprising the steps of:

responsive to the start of an update to the copy of the data, marking the state of the production data as being ready for being incrementally copied to update the data copy to account for incremental changes to the production data since either a full copy or a prior incremental copy was performed, wherein the production data is marked in a data structure that includes a tracking data structure and a transfer data structure;

preparing to update the data copy by protecting the production data from being written over until an incremental copy operation is performed by designating a current tracking data structure as the transfer data structure and a current transfer data structure as the tracking data structure;

updating the data copy in accordance with the incremental copy operation being performed from the contents of the transfer data structure; and marking the state of the production data as having been transferred, and unprotecting the production data thereby allowing it to be written over by designating the transfer data structure as the current tracking data structure.

2. The method of claim 1, wherein the state of the production data is marked in the data structure is created during an administrative session related to the incremental copy operation.

3. The method as recited in claim 1 further comprising the step of:

indicating a region within the transfer data structure of data to be transferred.

4. The method of claim 2 wherein there is no copy on a first write request from the server to write over production data unless a mark is made in association with the administrative session.

5. The method of claim 4, wherein a copy on first write only occurs if the state of the production data is marked as being ready for being incrementally copied.

6. A system for handling updates to a copy of production data, the system comprising:
- a first data storage system having production data stored on it;
- a second data storage system in communication with the first data storage system, and having a copy of the production data nominated as a data copy;
- a server in communication with the first data storage system;
- computer-executable program logic configured for causing the following computer-executed steps to occur:
- responsive to the start of a update to the copy of the data, marking the state of the production data as being ready for being incrementally copied to update the data copy to account for incremental changes to the production data since either a full copy or a prior incremental copy of the production data was performed, wherein the production data is marked in a data structure that includes a tracking data structure and a transfer data structures
- preparing to update the data copy by protecting the production data from being written over until an incremental copy operation is performed by designating a current tracking data structure as the transfer data structure and a current transfer data structure as the tracking data structure;
- updating the data copy in accordance with the incremental copy operation being performed from the contents of the transfer data structure; and
- marking the state of the production data as having been transferred, and unprotecting the production data thereby allowing it to be written over by designating the transfer data structure as the current tracking data structure.

7. The system of claim 6, wherein the state of the production data is marked in the data structure is created during an administrative session related to the incremental copy operation.

8. The system as recited in claim 6, wherein the further computer-executed step is caused to occur:
- indicating a region within the transfer data structure of data to be transferred.

9. A program product for use in a data storage environment and being for handling updates to a copy of production data, wherein the data storage environment includes:
- a first data storage system having production data stored on it;
- a second data storage system in communication with the first data storage system, and having a copy of the production data nominated as a data copy;
- a server in communication with the first data storage system; and
- the program product includes computer-executable logic contained on a computer-readable medium and which is configured for causing the following computer-executed step to occur:
  - responsive to the start of an update to the copy of the data, marking the state of the production data as being ready for being incrementally copied to update the data copy to account for incremental changes to the production data since either a full copy or a prior incremental copy was performed, wherein the production data is marked in a data structure that includes a tracking data structure and a transfer data structure;
- preparing to update the data copy by protecting the production data from being written over until an incremental copy operation is performed by designating a current tracking data structure as the transfer data structure;
- updating the data copy in accordance with the incremental copy operation being performed from the contents of the transfer data structure; and
- marking the state of the production data as having been transferred, and unprotecting the production data thereby allowing it to be written over by designating the transfer data structure as the current tracking data structure.

10. The computer-program product as recited in claim 9, wherein the further computer-executed step is caused to occur:
- indicating a region within the transfer data structure of data to be transferred.

* * * * *